United States Patent [19]
Bobbio et al.

[11] Patent Number: 5,434,464
[45] Date of Patent: Jul. 18, 1995

[54] UNIDIRECTIONAL SUPPORTING STRUCTURE FOR MICROELECTROMECHANICAL TRANSDUCERS

[75] Inventors: Stephen M. Bobbio, Wake Forest; Thomas D. DuBois; Farid M. Tranjan, both of Charlotte, all of N.C.; Youssef Bousaba, Albuquerque, N. Mex.; James D. Jacobson, Durham, N.C.; Scott H. Goodwin-Johansson, Pittsboro, N.C.; Kerstin McKay, Durham, N.C.

[73] Assignee: MCNC, Research Triangle Park, N.C.

[21] Appl. No.: 247,562

[22] Filed: May 23, 1994

[51] Int. Cl.6 .............................................. H02N 1/00
[52] U.S. Cl. .................................................. 310/309
[58] Field of Search ...................... 310/309, 311, 328; 361/281, 289, 296

[56] References Cited
U.S. PATENT DOCUMENTS

| | | | |
|---|---|---|---|
| 2,975,307 | 3/1961 | Schroeder et al. | 310/309 |
| 3,008,014 | 11/1961 | Williamson et al. | 310/309 |
| 5,179,499 | 1/1993 | MacDonald et al. | 361/281 |
| 5,206,557 | 4/1993 | Bobbio | 310/309 |
| 5,375,033 | 12/1994 | MacDonald | 361/281 |

*Primary Examiner*—Mark O. Budd
*Attorney, Agent, or Firm*—Bell, Seltzer, Park & Gibson

[57] ABSTRACT

A microelectromechanical transducer including a plurality of parallel electrically conductive strips maintained in closely spaced relation by a plurality of spacers can generate useful displacements and forces. The transducer can be strengthened by arranging the conductive strips in cells surrounded by unidirectional cell stiffening members and unidirectional displacement limiting members. The unidirectional cell stiffening members may include notches. The unidirectional displacement limiting members may include unidirectional buckling straps or flexible arches. The cells of electrically conductive strips can be organized in modular or fractal arrays.

35 Claims, 6 Drawing Sheets

UNIDIRECTIONAL SUPPORTING STRUCTURE FOR MICROELECTROMECHANICAL TRANSDUCERS

This invention was made with government support under contract No. 70NANB2H1253 awarded by U.S. Department of Commerce. The Government has certain rights in this invention. (FAR Regulation 52.227-11(f)(4).)

FIELD OF THE INVENTION

This invention relates to an electromechanical transducer and more particularly to a microelectromechanical transducer having an array of closely spaced electrically conductive strips which move together responsive to an applied electrical signal.

BACKGROUND OF THE INVENTION

A transducer may be broadly defined as a device which converts one form of input energy to a different form of output energy. An electromechanical transducer, when configured to convert electrical energy to mechanical energy, may operate on the principle of electrostatic attraction caused by two opposing and oppositely charged conducting plates. For example, when electrical energy is input to the transducer in the form of a voltage applied between the plates, the plates are drawn together. If the plates are free to move together, the input electrical energy is converted into mechanical energy.

The plates of an electromechanical transducer may also be used to generate electrical energy from an input of mechanical energy. For example, the plates are first charged by an electrical voltage applied to the plates. The plates may then be disconnected from the charging source and mechanical energy used to further separate the plates. As the plates are separated, the voltage between the plates increases thereby converting the mechanical energy to electrical energy.

Accordingly, an electromechanical transducer may be used either as an actuator, sensor or power supply. As an actuator, the transducer may convert electrical power into mechanical motion, and, as a sensor or power supply, the transducer may convert mechanical motion into an electrical signal.

Electromechanical transducers have been developed which convert electrical energy to mechanical motion and ultimately to acoustic energy by the application of a voltage between a pair of spaced parallel conducting plates. If the plates are flexible or otherwise configured to allow motion, the plates are drawn together by the force of electrostatic attraction when the signal voltage is applied between the plates. See, for example, U.S. Pat. No. 3,008,014, to Williamson et al., which discloses an electrostatic transducer used in entertainment loudspeaker systems to convert electrical signals into sound. Since the driving voltage required to move the plates is related to the square of the separation between the plates, transducers of the type described in Williamson et al. require large and potentially hazardous driving voltages.

As is known in the art, the force generated by a pair of opposing parallel charged plates is inversely proportional to the square of the distance between the plates. The force generated by the plates increases by a power of two for a corresponding linear decrease in the separation between the plates. Accordingly, very large forces can be developed as the spacing between plates is decreased. In addition, for a given force, as the separation is decreased, the driving voltage can be reduced. Accordingly, there has been widespread interest in the development and manufacture of microminiature electromechanical transducers, or "microelectromechanical" transducers.

To obtain useful forces and physical displacements as the size of the separation between plates is reduced, a large number of plates must be concatenated or stacked together. An early attempt at fabricating a microelectromechanical transducer is described in U.S. Pat. No. 2,975,307, to Schroeder et al. This patent discloses an electrostatic transducer having a large number of stacked plates, each plate with an individual and discrete external wiring connection to the source of the driving voltage, and each pair of adjacent plates having a series of separators positioned in a precise pattern therebetween.

Unfortunately, it is difficult to connect each of the plates to a supply voltage in an array having a large number of closely spaced plates. In an array of closely spaced stacked plates, many hundreds or even thousands of discrete connections must be made to each plate in the stacked array of plates. In addition, the physical assembly of such a large number of plates, spacers, and other components of such small dimensions is extremely difficult and not, therefore, amenable to efficient manufacturing.

The microelectronics art has been highly successful in fabricating extremely dense microelectronic structures. For example, one million or more transistors have been fabricated on an integrated circuit chip less than 1 $cm^2$ in area. Accordingly, attempts have been made to use microelectronics manufacturing principles and techniques to fabricate microelectromechanical transducers.

A major advance in the design and manufacture of microelectromechanical transducers is described in U.S. Pat. No. 5,206,557, entitled *Microelectromechanical Transducer and Fabrication Method* to coinventor Stephen M. Bobbio, the disclosure of which is incorporated herein by reference. An electromechanical transducer having a large number of conductive strips with a small separation between adjacent strips is described. This transducer avoids the need for individual discrete wiring to each strip.

The transducer of Pat. No. 5,206,557, is formed of a plurality of electrically conductive strips arranged in an array, with adjacent portions of the strips being maintained in a closely spaced relation by a series of spacers positioned between the adjacent portions of the strips. The spacers have electrically conductive portions to distribute the electrical signal within the transducer, thereby forming an internal distribution network and eliminating the need for discrete electrical connections to be made to each conductive strip in the transducer. The strips are preferably made of a flexible dielectric material having an electrically conductive layer on selected outer surfaces thereof. The dielectric strips and spacers are preferably formed from a common dielectric layer using microelectronic fabrication techniques to thereby greatly simplify fabrication and avoid the need for assembling a myriad of microscopic elements.

By integrating large numbers of electrically conductive strips and spacers into a single device, certain advantages can be realized. The force exerted by the transducer and the range of motion of the transducer can both be increased. However, these integrated devices may be subject to weaknesses caused by a weak pair of conductive strips. Nonfunctional pairs of conductive strips may stretch apart under a load thereby absorbing a part of the contraction of the functioning pairs of conductive strips within the array. Uneven load distribution may result in localized distortions which decrease the force exerted by the transducer. In addition, the resistor/capacitor time constant may result in a time delay when charging the device. Furthermore, the fine nature of the transducer elements may result in damage due to handling, attachment to larger systems and operation over an extended operational lifetime.

Further advances are described in the paper entitled *Integrated Force Arrays*, Bobbio et al., IEEE Micro Electro Mechanical Systems Proceedings, February, 1993, the disclosure of which is incorporated herein by reference. The transducer elements are arranged into cells and arrays of cells which are surrounded by a more substantial supporting structure. The supporting structure leads to an overall improvement in robustness, improved load distribution, and amelioration of irregularities in cell performance. The cells may be arranged into modular or fractal arrays. These arrangements make it possible to trade force for compression by connecting the cells differently. This supporting structure, however, may resist the contraction of the transducer thereby reducing the force exerted by the transducer and increasing the power consumed.

SUMMARY OF THE INVENTION

It is therefore an object of the present invention to provide an improved microelectromechanical transducer having a large number of electrically conductive strips.

It is another object of the present invention to provide a robust microelectromechanical transducer having a large number of pairs of electrically conductive strips.

It is yet another object of the invention to provide a robust microelectromechanical transducer which is capable of contracting without requiring excessive force or power.

These and other objects according to the present invention are provided by a high strength microelectromechanical transducer including an array of transducer cells, each of which comprises a plurality of pairs of electrically conductive strips and a plurality of spacers positioned between adjacent portions of the strips and connected thereto. The high strength transducer also includes a plurality of unidirectional cell stiffening means, a respective one of which is attached to a respective one of the cells, for allowing the respective cell to contract relatively easily, while expansion is strongly resisted.

Alternatively, and preferably additionally, the transducer includes a plurality of unidirectional displacement limiting means, a respective one of which is attached to a respective one of the cells, for limiting the outward displacement of the electrically conductive strips relative to one another, without significantly limiting inward displacement of the conductive strips relative to one another. The unidirectional stiffening means and/or displacement limiting means produce a high strength microelectromechanical transducer, notwithstanding weakness or failure of strips in individual cells. The invention may also comprise a single cell of strips and spacers having unidirectional displacement limiting means and/or unidirectional cell stiffening means.

In an embodiment of the present invention, each cell is surrounded by a frame which includes the unidirectional cell stiffening means and the displacement limiting means. In this embodiment, the unidirectional cell stiffening means comprises a pair of unidirectional cell stiffening members, and the displacement limiting means comprises a pair of displacement limiting straps. Each unidirectional cell stiffening member comprises a beam which is stiff relative to the conductive strips, and each member is located at opposite ends of the cell. The unidirectional cell stiffening members are oriented parallel to the conductive strips and perpendicular to the direction of contraction thereby distributing the load evenly along the end of the cell. Each displacement limiting strap comprises a beam which is flexible relative to the stiffening means, and each is located at opposite sides of the cell. The displacement limiting straps are oriented perpendicular to the conductive strips and parallel to the direction of contraction thereby limiting the outward expansion of the cell.

Preferably, the unidirectional cell stiffening members are achieved by providing the cell stiffening member with a notch. In a preferred embodiment, the stiffening member includes a first side relatively close to the associated cell of electrically conductive strips, and the notch is included in this side. When the cell contracts, the stiffening member is pulled inwardly toward the associated cell, and the notch widens. The stiffness of the beam when pulled in this direction is determined by the thickness of the beam minus the depth of the notch. Accordingly, the contracting transducer cell does not expend as much energy overcoming the stiffness of the stiffening member as it would if there were no notch. When the ends of the transducer are pulled outwardly by an external force, the stiffness of the member is initially determined by the thickness of the member minus the notch as discussed above. However, once the beam is bent to the point that the notch closes, the stiffness is determined by the full width of the beam. Accordingly, the notch allows the stiffening member to resist the pull of external forces with a greater stiffness than it resists the pull of the contracting transducer cell. A unidirectionally stiff member is thereby provided.

The unidirectional displacement limiting means may include a base adjacent one end of the cell and a flexible arch having a pair of opposing ends connected to the base wherein the arch extends away from the base and is connected to the opposite end of the cell. These displacement limiting arches are located along the sides of the transducer cells. When the cell is pulled apart by an external force, the expansion of the cell is limited by the stretch of the arch. When the cell contracts however, the arch bends and collapses at a low force relative to the force required to stretch it. When the cell goes back to the unpowered uncontracted state, the arch springs back to its original form. The flexible arch resists outward expansion with a greater force than it resists inward compression, to produce a unidirectional displacement limiting means.

Alternatively, a unidirectional displacement limiting means may be achieved by providing a unidirectional buckling strap across each of the opposite sides of the associated transducer cell. The unidirectional backing strap works by limiting the outward displacement of the cell due to the force required to elongate the strap. The strap does not limit the contraction of the cell because the strap will buckle. By making the straps in different geometries, the properties of the strap can be altered.

For example, a curved strap will buckle at a lower force than a straight strap. When pulled outwardly, the curved strap will straighten out under the tension before reaching its elongation limit.

The fabrication process for the microelectromechanical transducer including cells is preferably similar to that disclosed in the present inventor's prior U.S. Pat. No. 5,206,557. Thus, the unidirectional cell stiffening members, unidirectional displacement limiting straps, and the dielectric portion of the electrically conductive strips can be formed of polyimide during the same fabrication step. By making the stiffening members wide relative to the conductive strips, the stiffening members are stiff relative to the conductive strips.

The microelectromechanical transducers of the present invention can include a single cell including a plurality of conductive strips, or preferably an array of such cells. In either case, the unidirectional cell stiffening members, the unidirectional displacement limiting straps or a combination of the two may provide significant advantages. The unidirectional cell stiffening members distribute the load across the transducer cell while the unidirectional displacement limiting straps limit unwanted expansion of the transducer. Both of these elements increase the physical robustness of the transducer during fabrication and operation by providing a substantial supporting structure. Both elements also provide additional surfaces for wiring traces which reduce the overall resistance of the voltage distribution network thereby reducing the time delays which result from the resistor/capacitor time constant. Accordingly, the conductive strips contract relatively simultaneously responsive to the application of a control voltage thereby reducing the problem of late charging conductive strips.

Further advantages are realized when the transducer includes arrays of cells of conductive strips with unidirectional displacement limiting straps, unidirectional cell stiffening members or the combination of the two. By dividing the transducer into cells, the effect of a weak pair of conductive strips is isolated within a single cell. Time delays are also limited to the propagation of the signal through individual cells thereby reducing the number of conductive strips which contract before all of the strips have been charged. Furthermore, adjacent cells support one another reducing the deformation of the overall transducer when subject to a load.

In addition, transducers including large scale arrays of cells of electrically conductive strips allow for new principles of mechanical advantage and make it possible to trade force for compression by connecting the cells in various patterns. In a modular array, the cells are aligned in straight columns oriented parallel to the direction of contraction and perpendicular to the electrically conductive strips, and straight rows oriented perpendicular to the direction of contraction and parallel to the conductive strips. The sides of the cells in a row may serve as connections between adjacent cells, and discrete connectors may link adjacent cells within columns. In this arrangement, each column of cells represents one string of connections to the load. The force exerted by the transducer is approximately equal to the force of a single cell multiplied by the number of columns of cells. The contraction of the transducer is approximately equal to the contraction of a single cell multiplied by the number of rows of cells.

In a fractal array, the cells are also arranged in rows and columns. Like the modular array, the cells of the fractal arrays are aligned in straight rows oriented perpendicular to the direction of contraction and parallel to the conductive strips. While the columns of the fractal array are oriented parallel to the direction of contraction like the columns of the modular array, the adjacent cells within columns are offset from one another. In the preferred embodiment, the electrically conductive strips and the ends of each cell are the same predetermined length, and adjacent cells within columns are offset from each other by half of this predetermined length. In this embodiment, the sides of the cells in a row serve as the connections between the cells in that row, and the ends of the cells in a row serve as the connections to the cells in adjacent rows. When comparing modular and fractal arrays of the same dimensions, the force exerted by the fractal array transducer is approximately twice that of the modular array, and the compression is approximately half that of the modular array.

Accordingly, microelectromechanical transducers are strengthened by arranging the conductive strips and spacers into cells wherein each cell includes unidirectional cell stiffening means, unidirectional displacement limiting means, or both. Individual cells can be used advantageously to create individual microelectromechanical transducers. By arranging cells into arrays, the operation of a transducer can be further enhanced. Unidirectional cell stiffening means and unidirectional displacement limiting means reduce the power required to contract the transducer and increase the force exerted by the transducer when compared to cells having conventional cell stiffening means and conventional displacement limiting means.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 1:
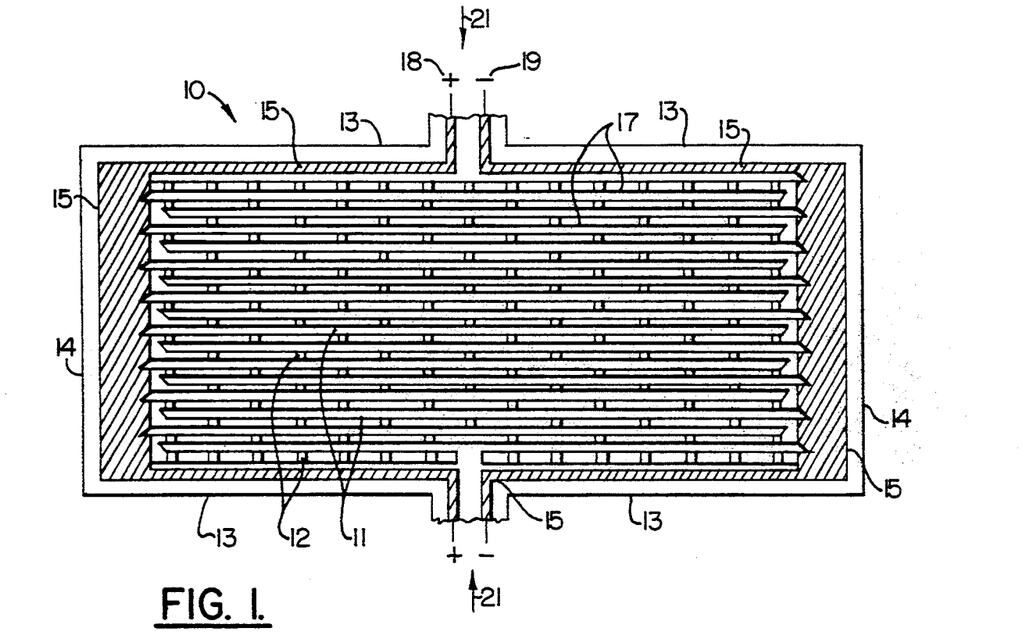
FIG. 1 is a top view of a cell of electrically conductive strips and spacers including cell stiffening members and displacement limiting straps in a relaxed, or unpowered, state.

Referring to FIG. 1 there is shown a microelectromechanical transducer comprising a cell 10. The cell 10 includes a plurality of parallel electrically conductive strips 11. While any number of strips 11 may be included in a cell 10, a cell preferably includes six electrically conductive strips. The strips 11 are maintained in a closely spaced relation by spacers 12 positioned between and connected to the strips 11. The strips 11 are preferably formed of a flexible dielectric material such as polyimide and include an electrically conductive layer 17. The flexible strips 11 and the spacers 12 permit the cell to contract from the relaxed state responsive to an application of electrical signals such as an electrical voltage.

Stiffening members 13 frame the cell 10 along the two ends of the cell. The stiffening members 13 are oriented parallel to the strips 11 and perpendicular to the direction of contraction shown by arrow 21. In FIG. 1, displacement limiting straps 14 frame the cell 10 along the two sides of the cell. In other arrangements, displacement limiting straps can lay across the cell of parallel conductive strips or run through the cell. The displacement limiting straps 14 are oriented perpendicular to the strips 11 and parallel to the direction of contraction shown by arrows 21. The stiffening members 13 distribute the load along the length of the strips 11. The displacement limiting straps limit the outward expansion of the sides of the cell of microelectromechanical transducer elements. The displacement limiting straps and the cell stiffening members of FIG. 1 may also limit the inward contraction of the sides of the cell.

Portions of stiffening members 13 and displacement limiting straps 14 are selectively covered with a metal layer forming the distribution network 15 for electrical control signals. The electrical control signals are supplied through the positive signal input 18 and the negative signal input 19. The distribution network 15 reduces capacitive time delays which result from charging the large number of parallel conductive strips 11. Accordingly, the strips within a cell charge and therefore contract at substantially the same time.

The strips 11, spacers 12, stiffening members 13, and displacement limiting straps 14 may be formed by etching a common layer of a material, such as polyimide. Etching a common layer of polyimide to form strips and spacers is described in U.S. Pat. No. 5,206,557, at column 14, lines 7-68. The conductive layers 17 and the distribution network 15 may then be applied in a single processing step by depositing a self-aligned metal layer onto predetermined portions of the strips 11, spacers 12, stiffening members 13, and displacement limiting straps 14, similar to the process described in Pat. No. 5,206,557, for metallizing the strips and spacers. Forming the cell 10 from a common layer obviates the need for first fabricating the individual discrete strips 11, spacers 12, stiffening members 13, and displacement limiting straps 14, and then assembling the cell 10 from these discrete pieces. The width of the spacing between adjacent strips 11 within the cell 10 may be very small and a large number of strips 11 may be utilized to create useful displacements and useful contraction forces. For example, the strips 11 within cell 10 may be 0.5 $\mu$m wide and 160 $\mu$m long and the spacing between adjacent strips may be 1 $\mu$m. The distance between neighboring spacers may be 20 $\mu$m. The conductive strips, displacement limiting straps, and stiffening members are the same thickness which is determined by the thickness of the original polyimide layer. This thickness may be about 2 $\mu$m. The displacement limiting members may be about 8 $\mu$m wide, and the stiffening members may be about 2 $\mu$m wide. A cell 10 measuring 50 $\mu$m from end to end may therefore contain approximately 33 parallel strips 11. Although some flexibility is sacrificed, this embodiment leads to an overall improvement in robustness (particularly in the wiring traces for voltage distribution), improved load distribution, and amelioration of irregularities in cell performance (e.g. a weak link in a series of parallel electrically conductive strips).

Figure 2A:
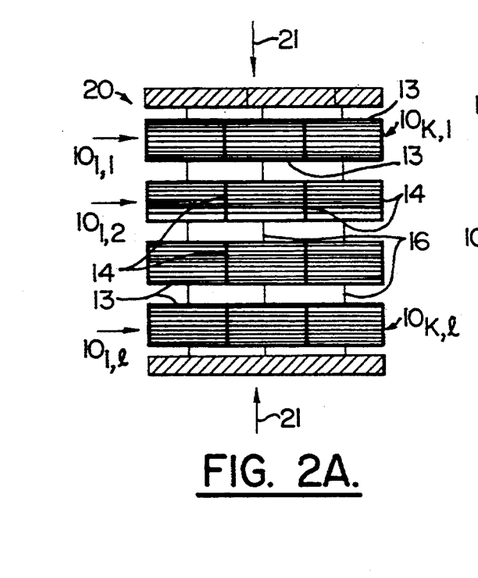
FIG. 2A is a top view of a modular array of cells of electrically conductive strips and spacers in a relaxed, or unpowered, state.
Figure 2B:
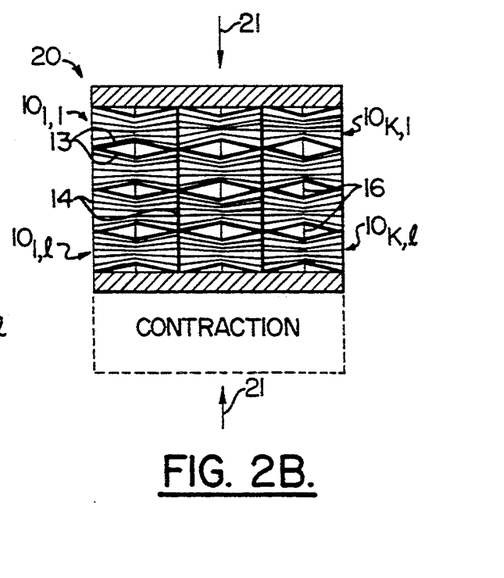
FIG. 2B is a top view of a modular array of cells of electrically conductive strips and spacers as shown in FIG. 2A in a contracted, or powered, state.

Referring to FIGS. 2A and 2B, there is shown a microelectromechanical transducer comprising a modular array 20 of cells $10_{1-k,\ 1-1}$. The modular array 20 includes a plurality of cells $10_{1-k,\ 1-1}$ where k is the number of columns and l is the number of rows. Each cell 20 is surrounded by a supporting structure which includes cell stiffening members 13 and displacement limiting straps 14. The cell stiffening members 13 are located at opposite ends of each cell $10_{k,\ 1}$, and oriented perpendicular to the direction of contraction shown by arrow 21. The displacement limiting straps 14 are located at opposite sides of each cell, and oriented parallel to the direction of contraction shown by arrow 21.

The rows of cells are arranged perpendicular to the direction of contraction shown by arrows 21. Cells 10 within rows are collinear, and these cells are connected on each side with adjacent cells. The connection is made at the displacement limiting straps 14. By maintaining the relative positions of the cells within the array during operation, these connections reduce the deformation of each cell when subject to a load.

The columns of cells are arranged parallel to the direction of contraction as shown by arrows 21. Cells within columns are collinear, and these cells are connected by column connectors 16. Each column of cells within the array contributes to the force exerted by the array. Thus, the force exerted by the transducer array is approximately equal to the force exerted by a single cell multiplied by the number of columns of cells within the array. The compression of the transducer array is approximately equal to the contraction of an individual cell multiplied by the number of rows of cells in the array.

FIG. 2A illustrates a transducer consisting of a modular array of cells of transducer elements in the relaxed or unpowered state. FIG. 2B illustrates the same modular array in the contracted, or powered, state.

Figures 3A, 3B:
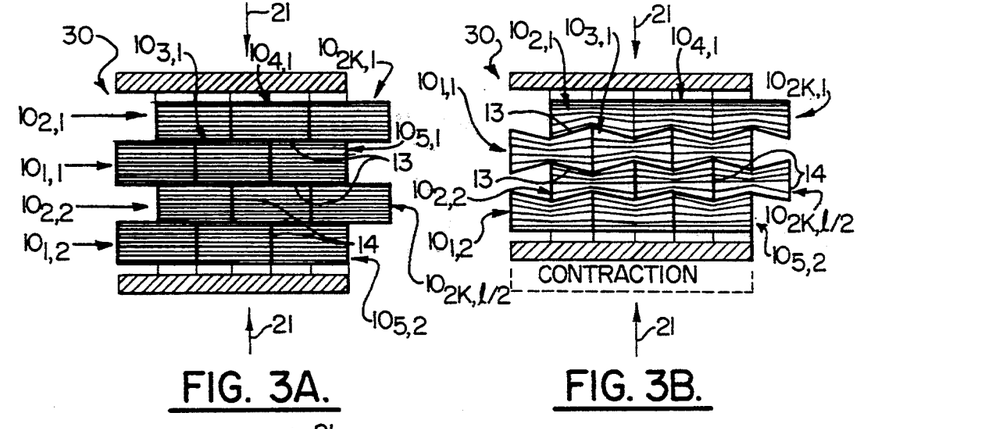
FIG. 3A is a top view of a fractal array of cells of electrically conductive strips and spacers in a relaxed, or unpowered, state.
FIG. 3B is a top view of a fractal array of cells of electrically conductive strips and spacers as shown in FIG. 3A in a contracted, or powered, state.

Referring to FIGS. 3A and 3B, there is shown a fractal Array 30 of cells 10. FIG. 3A illustrates the Fractal Array in the relaxed, or unpowered, state while FIG. 3B illustrates the Fractal Array in the contracted or powered state. Like the modular array, the fractal array consists of cells arranged in rows and columns. The rows of cells are arranged perpendicular to the direction of contraction. Cells within rows are collinear, and these cells are connected on each side with adjacent cells. The connection is made at displacement limiting straps 14.

The cells within columns, however, are offset. The electrically conductive strips and both ends of each cell may be the same predetermined length, and cells within columns are offset by half of this predetermined length producing a bricked pattern. Accordingly, each cell is adjacent two cells in the row above, and two cells in the row below. In the fractal array, the need for column connectors is eliminated, and the end of each cell is connected directly to the two adjacent cells in the row above and the two adjacent cells in the row below. This connection is made at the cell stiffening members 13 which are located at the ends of each cell.

In FIG. 3, the displacement limiting straps 14 of the cells in one row serve as connectors between the cells in the two adjacent rows thereby doubling the number of connections between the upper and lower array edges as compared to a modular array. Even though the same number of cells are used as in the transducer of FIG. 2, the offset in effect increases the number of columns by a factor of 2 while decreasing the number of rows by a factor of 2. The cells $10_{2k, \frac{1}{2}}$ are numbered to indicate the effect of this offset when compared to the embodiment of FIG. 2. The fractal array has in effect 2 k columns of cells and ½ rows of cells.

Thus, a fractal array increases the array force and decreases the compression by an approximate factor of two when compared to a modular array of the same dimensions. Like the modular array of FIGS. 2A and 2B, the interlocking of cells increases the robustness of the transducer array.

The devices of FIGS. 2 and 3 illustrating modular and fractal arrays specifically disclose three levels of hierarchy including parallel conductive strips, cells of strips, and arrays of cells. The concept of subdividing a microelectromechanical transducer, however, can be applied to extended levels of hierarchy.

The cells and arrays of cells of transducer elements discussed above may expand as easily as they contract. In the embodiments of the present invention that follow, however, the cells contract relatively easily while expansion is strongly resisted. This rigidity to expansion limits weak cell effects by allowing a weak or dysfunctional cell to transmit force along a chain of cells even though it does not add to the contraction of the chain.

Figure 4A:
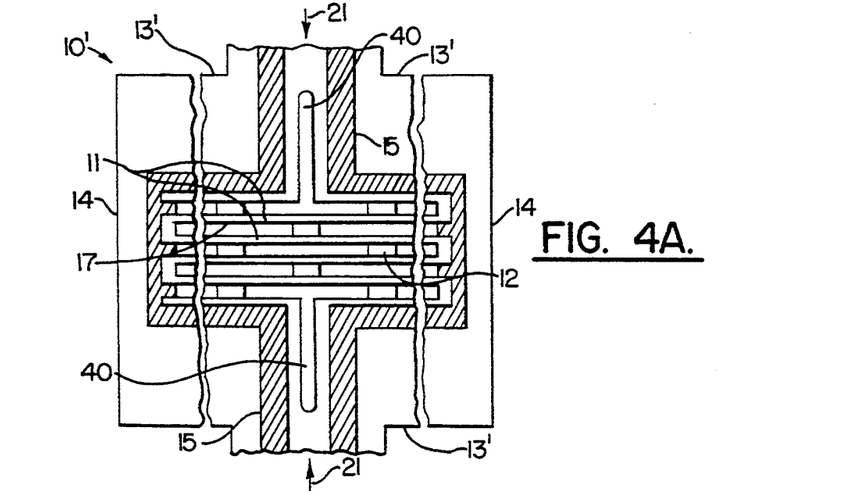
FIG. 4A is a top view of a single cell of electrically conductive strips and spacers including unidirectional cell stiffening members with notches.

Referring to FIGS. 4A-4D, there is shown a preferred embodiment of the cell 10' of electrically conductive strips and spacers. In this embodiment, the cell has unidirectional cell stiffening members 13' including notches 40. FIG. 4A illustrates an individual cell 10' of transducer elements including strips 11 with electrically conductive layers 17 and spacers 12. The cell 10' also includes displacement limiting straps 14 along each side of the cell and stiffening members 13' along each end of the cell. The stiffening members 13' of this embodiment include notches 40 which enable the stiffening member to act unidirectionally. The notches are included in the side of each stiffening member closest to the conductive strips of the associated cell.

Figure 4B:
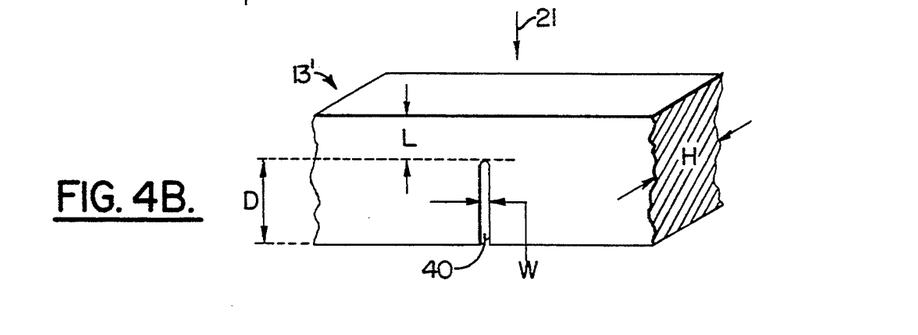
FIG. 4B is a top perspective view of a portion of a unidirectional cell stiffening member including a notch in the relaxed state.

Referring to FIG. 4B, there is shown a portion of a unidirectional cell stiffening member 13' including a notch 40. The notch of this embodiment is about 0.5 μm wide W and D micrometers long. The distance L from the top of the notch 40 to the edge of the unidirectional stiffening member 13' is about 2 μm, and the unidirectional stiffening member 13' is about 2 μm high H. When the transducer contracts, the stiffening member flexes toward the electrically conductive strips of the associated cell. Most flexure along the unidirectional stiffening member 13' occurs at the top of the notch 40 which is the narrowest point along the member, and the notch widens. Accordingly, the stiffness of the stiffening member 13' when operating in this mode is determined by the approximately 2 μm distance L from the top of the notch to the edge of the member.

Figure 4C:
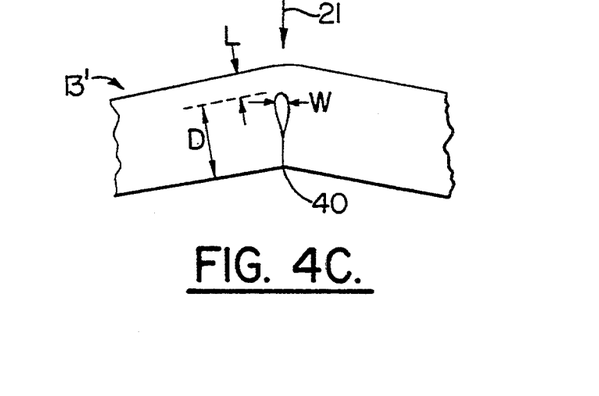
FIG. 4C is a top perspective view of a portion of a unidirectional cell stiffening member including a notch which is bowed to the limit allowed by the notch.

Referring now to FIG. 4C, there is shown a unidirectional stiffening member 13' including a notch 40 being subject to an expansion or outward displacement of the cell. In this mode, the unidirectional stiffening member 13' bows outwardly at the top of the notch 40 until the notch closes. At this point, the unidirectional stiffening member resists further deformation with the stiffness of its entire width (L+D) so that the ratio of stiffness toward expansion to stiffness toward compression is approximately $[(L+D)/L]^3$.

The effect of the notch length is demonstrated in Table 1 below. For given notch lengths, an approximate ratio of forces $F/f_0$ is given. F represents the force exerted by the charged pair of electrically conductive strips adjacent the unidirectional stiffening member including a notch when the member is subject to maximum outward bow, and $f_0$ represents the force exerted by the same charged pair of strips when there is no outward bow. The table also demonstrates the relative stiffness of the unidirectional stiffening member when bowed outwardly as opposed to its stiffness when pulled inwardly. The stiffness ratio is calculated with the Formula $[(L+D)/L]^3$. This table is based on a 1 μm spacing between electrically conductive strips and a 1.5 μm spacing between the conductors when the transducer is relaxed; a 12 μm length between neighboring spacers; a 0.5 μm notch width W; and a 2 μm distance L from the top of the notch to the edge of the unidirectional stiffening member. The table is also based on the assumption that the expansion due to the outward bow is taken up by the force elements closest to the notches on each unidirectional stiffening member. As shown by Table 1, the notch limits the distortion and the resulting force reduction experienced by this pair of strips.

TABLE 1

| Notch Length in Micrometers (D) | F/f₀ | Stiffness Ratio |
|---|---|---|
| 10 | .82 | 216.0 |
| 5 | .69 | 42.9 |
| 2 | .44 | 8 |
| 1 | .25 | 3.8 |

TABLE 1-continued

| Notch Length in Micrometers (D) | F/f₀ | Stiffness Ratio |
| --- | --- | --- |
| 0.5 | .11 | 2.0 |

This ratio $F/f_0$ can be determined by the formula, $F/f_0=(1+2W/D)^{-2}$.

Figure 4D:
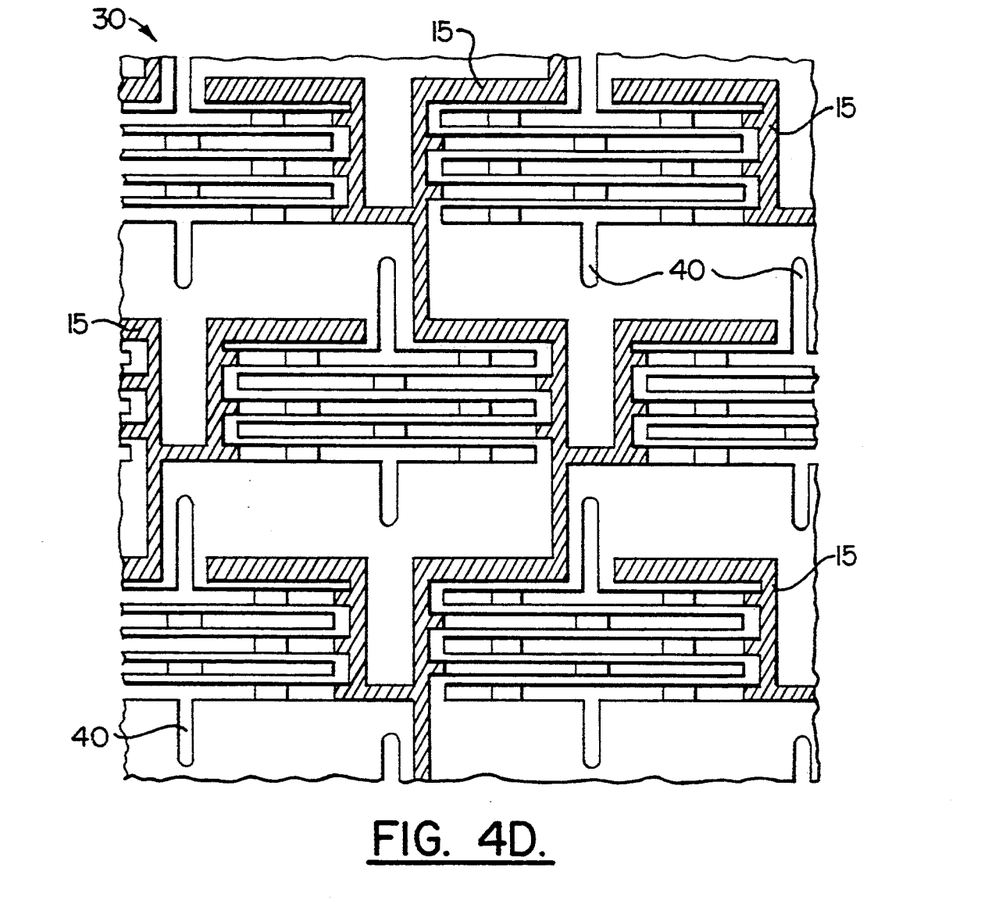
FIG. 4D is a top view of a fractal array of cells of electrically conductive strips and spacers as shown in FIG. 4A.

Referring now to FIG. 4D, there is shown a portion of a fractal array of transducer cells including unidirectional stiffening members with notches. This illustration demonstrates the combination of a fractal array 40, unidirectional stiffening members 13' with notches 40, and an enhanced distribution network 15 for electrical signals. Similarly, modular arrays can also be provided.

Figure 5A:
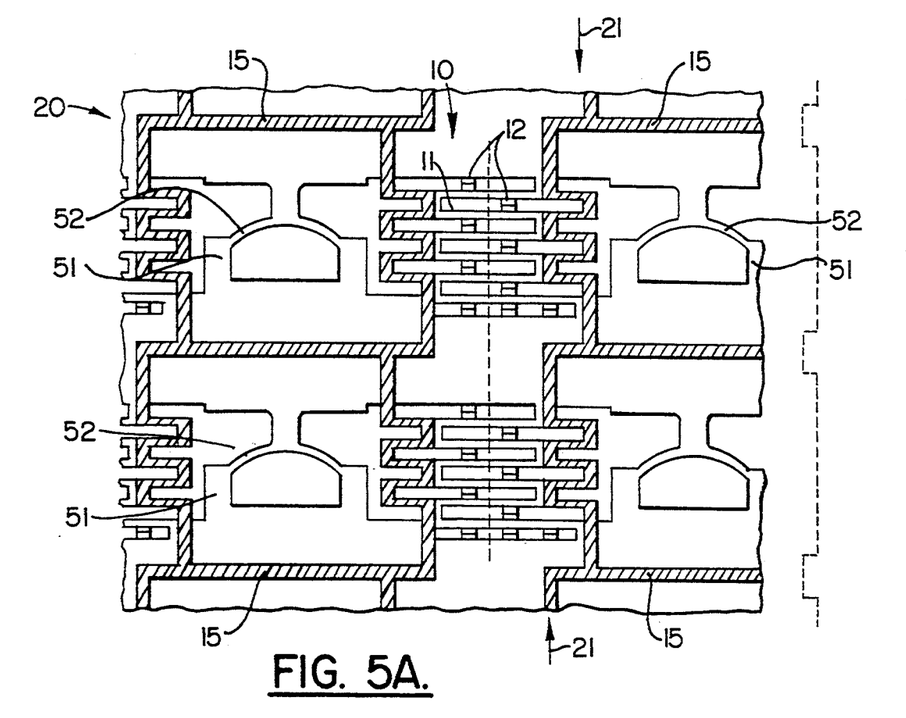
FIG. 5A is a top view of an array of cells of electrically conductive strips and spacers including unidirectional displacement limiting members in a relaxed, or unpowered, state.
Figure 5B:
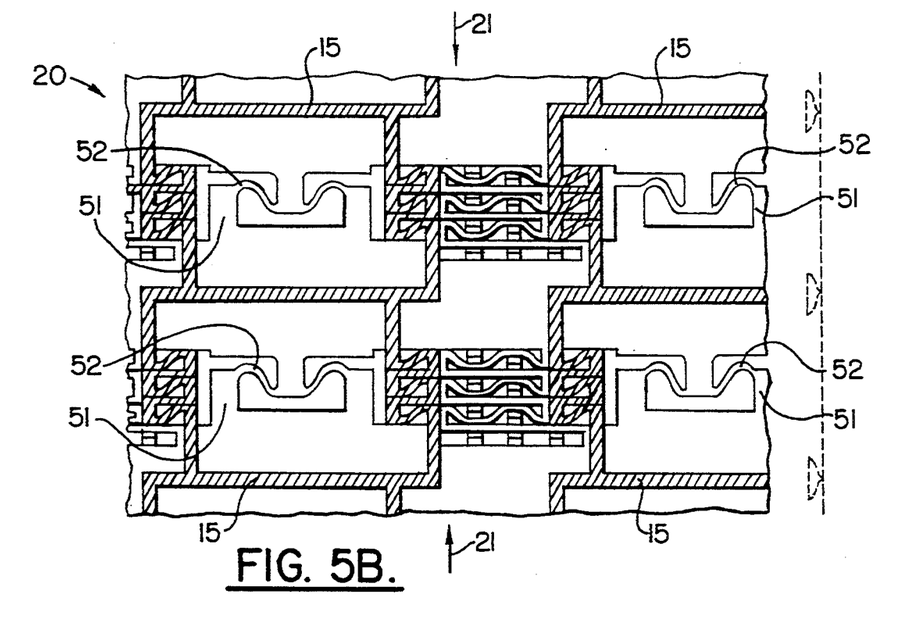
FIG. 5B is a top view of an array of cells of electrically conductive strips and spacers including unidirectional displacement limiting members as shown in FIG. 5A in a contacted, or powered, state.

Referring now to FIGS. 5A and 5B, there is shown a modular array 20 of cells 10 including a unidirectional displacement limiting means having a base 51 and a flexible arch 52. The base 51 is adjacent one end of the associated transducer cell. The arch 52 has a pair of opposing ends which are each connected to the base, and the arch extends to the opposite end of the cell where it is connected. The arch acts as a spring which is at equilibrium when the associated transducer cell 10 is in the relaxed, or unpowered, state as shown in FIG. 5A. When external forces act to expand the transducer cell, the arch 52 bends only to the point that the two halves are straightened. Once this happens, the transducer will only expand to the extent that the materials of the arch must stretch along its length. When the transducer cells contract, however, the arch collapses as illustrated in FIG. 5B. This motion is pure bending and involves no net stretching of material along the length of the arch. When the transducer is turned off, the arch springs back to equilibrium. Thus, unidirectional displacement limiting means is provided.

Figure 5C:
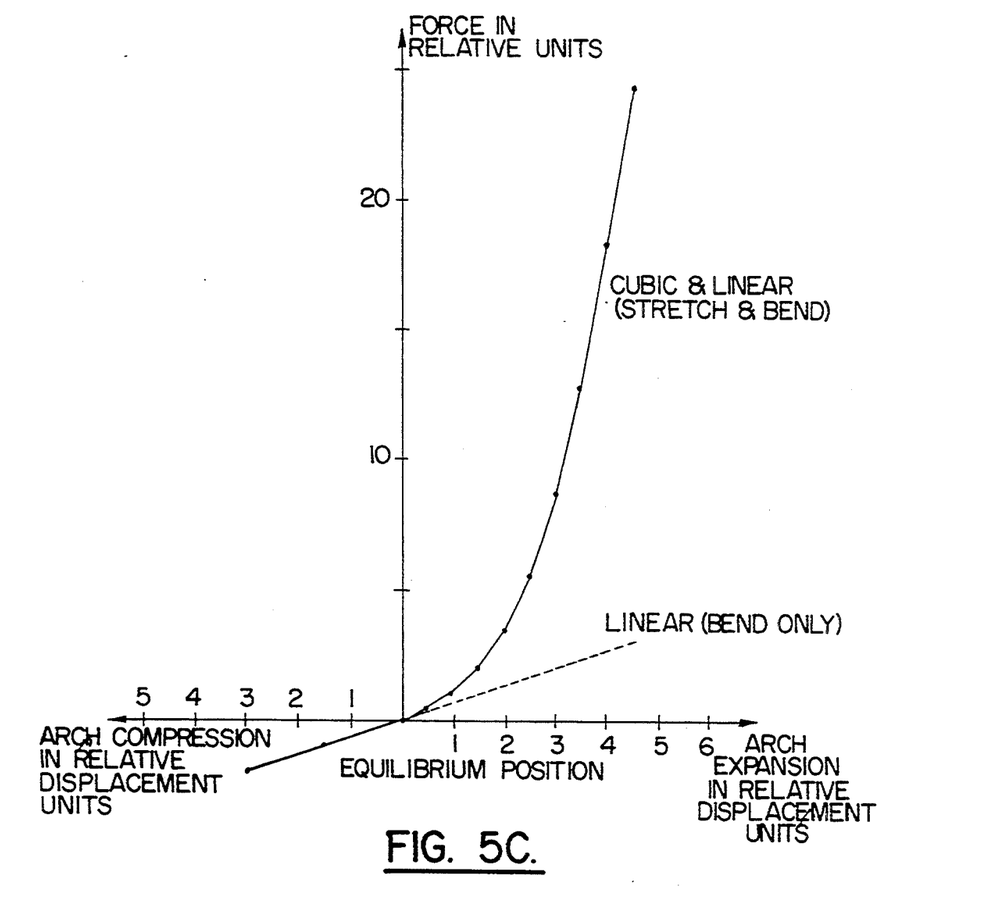
FIG. 5C graphically illustrates force as a function of the displacement of the unidirectional displacement limiting members of FIGS. 5A and 5B.

Referring to FIG. 5C, a graph illustrates the relationship of the force applied to the arch and the displacement of the cell. Negative displacements represent contraction of the transducer cell where the arch bends for which the force is approximately a linear function with respect to displacement. Positive displacements represent expansion of the transducer cell where the arch is stretched and the force is approximately a cubic function plus a linear function with respect to displacement. The origin represents the equilibrium position where the transducer is relaxed and there is no external force. As is clearly shown, the force required to bend the flexible arch is much less than the force required to stretch the arch. Accordingly, the flexible arch structure acts as a unidirectional displacement limiting member which limits the expansion of a transducer cell without restricting its ability to contract.

Figure 6A:
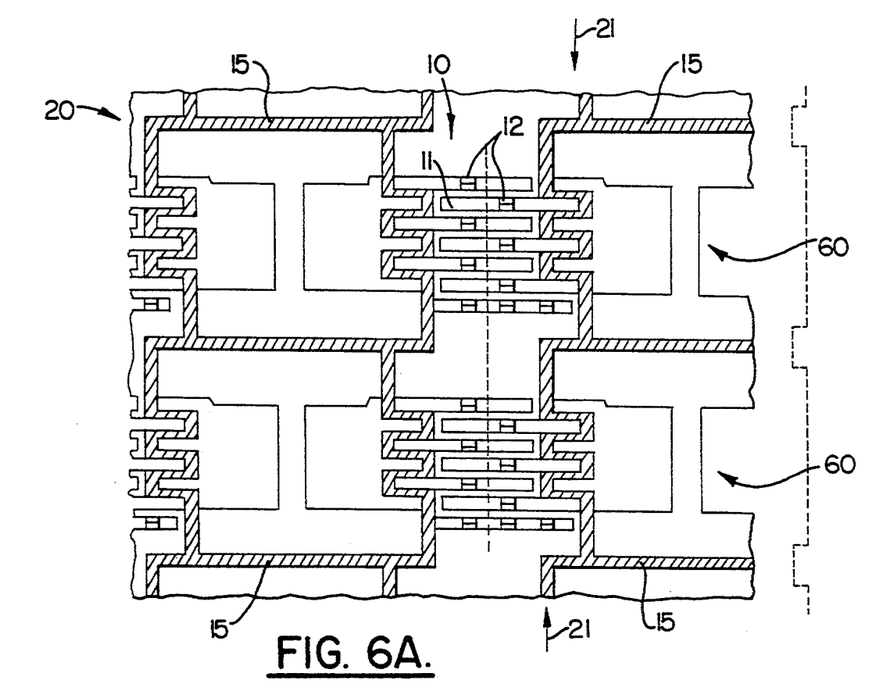
FIG. 6A illustrates a top view of an array of cells of electrically conductive strips and spacers including unidirectional buckling straps in a relaxed or unpowered state.
Figure 6B:
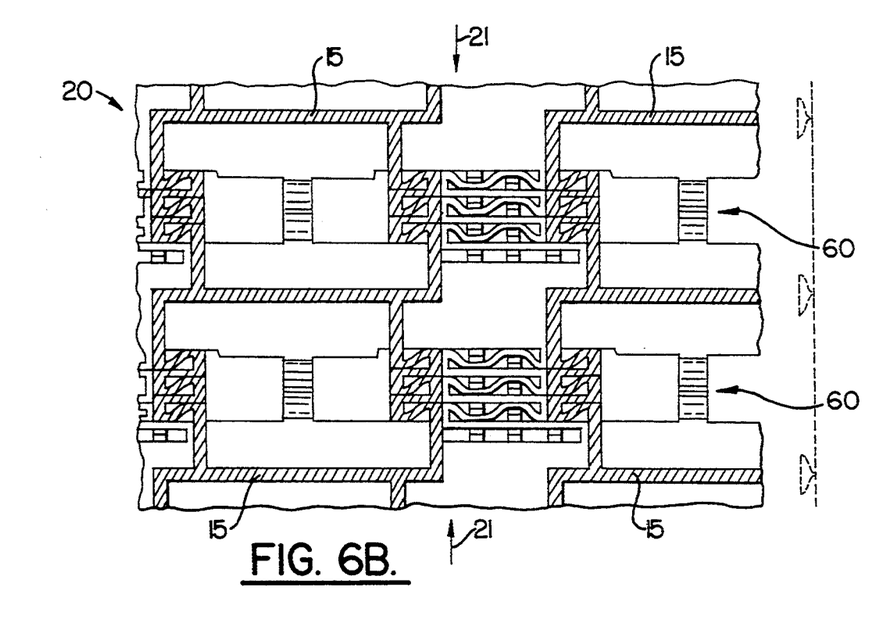
FIG. 6B illustrates a top view of an array of cells of electrically conductive strips and spacers including unidirectional buckling straps as shown in FIG. 6A in a contracted or powered state.

Referring now to FIG. 6A, there is shown a modular array of cells 10 of electrically conductive strips and spacers including unidirectional displacement limiting straps 60 in a relaxed or unpowered state. The unidirectional displacement limiting strap may also be used in a fractal array. In order to stretch the cell, the material of the strap must be stretched along its length. When the transducer contracts, however, the unidirectional displacement limiting strap 60 buckles out of the plane of the drawing as indicated by the shading on the straps in FIG. 6B. The strap may also be configured to buckle in other directions. As long as the force required stretch the strap is greater than the force required to buckle the strap, a unidirectional effect is achieved. For example, when a tensile force of nine dynes is applied to a polyimide strap 1 μm by 10 μm by 100 μm long, the elongation is 0.65 μm. The force required to buckle the strap, however, is 0.11 dynes. By making the strap in different geometries, the properties of the strap can be altered. A strap with curves built into it will buckle at a lower force than a straight strap. FIG. 6B illustrates modular array of cells including unidirectional displacement limiting straps in a contracted or powered state.

Many modifications and other embodiments of the invention will come to one skilled in the art having the benefit of the teachings presented in the foregoing descriptions and the associated drawings. Therefore, it is to be understood that the invention is not to be limited to the specific embodiments disclosed, and that modifications are intended to be included within the scope of the appended claims.

What is claimed is:

1. An electromechanical transducer, comprising:
an array of transducer cells, each of said cells comprising a plurality of electrically conductive strips arranged in closely spaced relation, and a plurality of spacers positioned between adjacent portions of said strips and connected thereto; and
a plurality of unidirectional cell stiffening means, a respective one of which is attached to a respective one of said cells for mechanically strengthening said cells.

2. The electromechanical transducer of claim 1 wherein said unidirectional cell stiffening means produces relatively low stiffness in said cell stiffening means in a first direction towards the associated conductive strips and a relatively high stiffness in a second direction away from the associated conductive strips.

3. The electromechanical transducer of claim 2 wherein said unidirectional cell stiffening means comprises a pair of stiffening members, each including at least one notch therein.

4. The electromechanical transducer of claim 3 wherein each of said stiffening members includes a first side relatively close to the associated cell and a second side relatively distant from the associated cell, and wherein said at least one notch is included in said first side.

5. The electromechanical transducer of claim 1 further comprising:
a plurality of displacement limiting means, a respective one of which is attached to a respective one of said cells for limiting displacement of said electrically conductive strips relative to one another.

6. The electromechanical transducer of claim 5 wherein said displacement limiting means comprises unidirectional displacement limiting means.

7. The electromechanical transducer of claim 5 wherein said displacement limiting means comprises at least one strap across the associated transducer cell.

8. The electromechanical transducer of claim 5 wherein said displacement limiting means comprises a strap across each of the opposite sides of the associated transducer cell.

9. The electromechanical transducer of claim 7 further comprising a distribution network for electrical signals wherein said network comprises an electrically conductive layer on predetermined portions of said strap.

10. The electromechanical transducer of claim 6 wherein said unidirectional displacement limiting means comprises:
a base adjacent one end of said cell;

a flexible arch having a pair of opposing ends, wherein said pair of opposing ends is connected to said base and wherein said flexible arch extends away from said base, towards an opposite end of said cell, and is connected to said opposite end of said cell.

11. The electromechanical transducer of claim 10 further comprising a distribution network for electrical signals wherein said network comprises an electrically conductive layer on predetermined portions of said base and on said flexible arch.

12. The electromechanical transducer of claim 1 wherein said array of transducer cells comprises a plurality of rows of transducer cells and a plurality of columns of transducer cells, wherein the cells in said rows are collinear and wherein the cells in said columns are collinear to provide a modular array.

13. The electromechanical transducer of claim 1 wherein said array of transducer cells comprises a plurality of rows of transducer cells and a plurality of columns of transducer cells, wherein the cells in said rows are collinear and wherein the cells in said columns are offset from one another to provide a fractal array.

14. The electromechanical transducer of claim 13 wherein each of said conductive strips is of a predetermined length and wherein said cells in said columns are offset from one another by half said predetermined length.

15. An electromechanical transducer, comprising:
an array of transducer cells, each of said cells comprising a plurality of electrically conductive strips arranged in closely spaced relation, and a plurality of spacers positioned between adjacent portions of said strips and connected thereto; and
a plurality of unidirectional displacement limiting means, a respective one of which is attached to a respective one of said cells for limiting displacement of said electrically conductive strips relative to one another.

16. The electromechanical transducer of claim 15 wherein said unidirectional displacement limiting means limits expansion of said array of transducer cells without limiting contraction of said array of transducer cells.

17. The electromechanical transducer of claim 15 wherein said displacement limiting means comprises at least one unidirectional displacement limiting strap across the associated transducer cell.

18. The electromechanical transducer of claim 15 wherein said displacement limiting means comprises a unidirectional displacement limiting strap across each of the opposite sides of the associated transducer cell.

19. The electromechanical transducer of claim 15 wherein said unidirectional displacement limiting means comprises:
a base adjacent one end of said cell;
a flexible arch having a pair of opposing ends, wherein said pair of opposing ends is connected to said base and wherein said flexible arch extends away from said base, towards an opposite end of said cell, and is connected to said opposite end of said cell.

20. The electromechanical transducer of claim 19 wherein each of said electrically conductive strips comprises a flexible dielectric strip having an electrically conductive layer on predetermined portions thereof and wherein said base, said flexible arch and said dielectric strips comprise a common material.

21. The electromechanical transducer of claim 19 further comprising a distribution network for electrical signals wherein said network comprises an electrically conductive layer on predetermined portions of said base and said flexible arch.

22. The electromechanical transducer of claim 15 wherein said array of transducer cells comprises a plurality of rows of transducer cells and a plurality of columns of transducer cells, wherein the cells in said rows are collinear and wherein the cells in said columns are collinear to provide a modular array.

23. The electromechanical transducer of claim 15 wherein said array of transducer cells comprises a plurality of rows of transducer cells and a plurality of columns of transducer cells, wherein the cells in said rows are collinear and wherein the cells in said columns are offset from one another to provide a fractal array.

24. An electromechanical transducer, comprising:
an array of transducer cells, each of said cells comprising a plurality of electrically conductive strips arranged in closely spaced relation, and a plurality of spacers positioned between adjacent portions of said strips and connected thereto;
a plurality of unidirectional cell stiffening means, a respective one of which is attached to a respective one of said cells for mechanically strengthening said cells; and
a plurality of unidirectional displacement limiting means, a respective one of which is attached to a respective one of said cells for limiting displacement of said electrically conductive strips relative to one another.

25. The electromechanical transducer of claim 24 wherein said unidirectional cell stiffening means produces relatively low stiffness in said cell stiffening means in a first direction towards the associated conductive strips and a relatively high stiffness in a second direction away from the associated conductive strips.

26. The electromechanical transducer of claim 24 wherein said unidirectional displacement limiting means limits expansion of said array of transducer cells without limiting contraction of said array of transducer cells.

27. The electromechanical transducer of claim 24 wherein said array of transducer cells comprises a plurality of rows of transducer cells and a plurality of columns of transducer cells, wherein the cells in said rows are collinear and wherein the cells in said columns are collinear to provide a modular array.

28. The electromechanical transducer of claim 24 wherein said array of transducer cells comprises a plurality of rows of transducer cells and a plurality of columns of transducer cells, wherein the cells in said rows are collinear and wherein the cells in said columns are offset from one another to provide a fractal array.

29. An electromechanical transducer, comprising:
an array of transducer cells, each of said cells comprising a plurality of electrically conductive strips arranged in closely spaced relation, and a plurality of spacers positioned between adjacent portions of said strips and connected thereto; and
a frame around each of said cells, said frame comprising:
a pair of unidirectional stiffening members, each of said members including a first side relatively close to the associated cell and a second side relatively distant from the associated cell, and wherein at least one notch is included in said first side, and a pair of unidirectional displacement limiting members;

wherein a respective one of said unidirectional stiffening members is attached to each respective end of an associated cell and a respective one of said unidirectional displacement limiting members is attached to each respective side of an associated cell.

30. The electromechanical transducer of claim 29 wherein said unidirectional displacement limiting members each comprise a unidirectional displacement limiting strap.

31. The electromechanical transducer of claim 29 wherein said displacement limiting members each comprise:

a base adjacent one end of said cell;

a flexible arch having a pair of opposing ends, wherein said pair of opposing ends is connected to said base and wherein said flexible arch extends away from said base, towards an opposite end of said cell, and connected to said opposite end of said cell.

32. The electromechanical transducer of claim 29 wherein said array of transducer cells comprises a plurality of rows of transducer cells and a plurality of columns of transducer cells, wherein the cells in said rows are collinear and wherein the cells in said columns are collinear to provide a modular array.

33. The electromechanical transducer of claim 29 wherein said array of transducer cells comprises a plurality of rows of transducer cells and a plurality of columns of transducer cells, wherein the cells in said rows are collinear and wherein the cells in said columns are offset from one another to provide a fractal array.

34. The electromechanical transducer of claim 33 wherein each of said conductive strips is of a predetermined length and wherein said cells in said columns are offset from one another by half said predetermined length.

35. The electromechanical transducer of claim 29 wherein said unidirectional cell stiffening members, said unidirectional displacement limiting members and said electrically conductive strips comprise a common material.

* * * * *